United States Patent Office 2,949,600
Patented Aug. 16, 1960

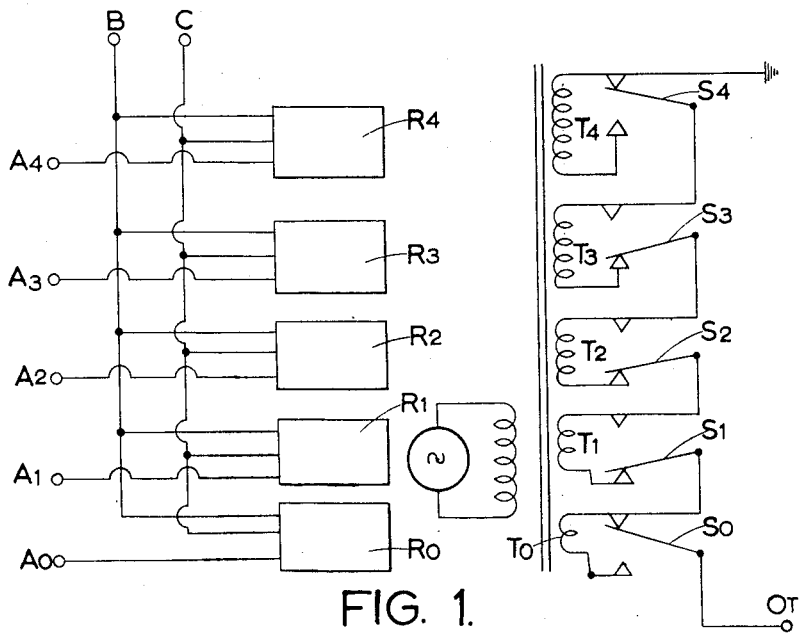
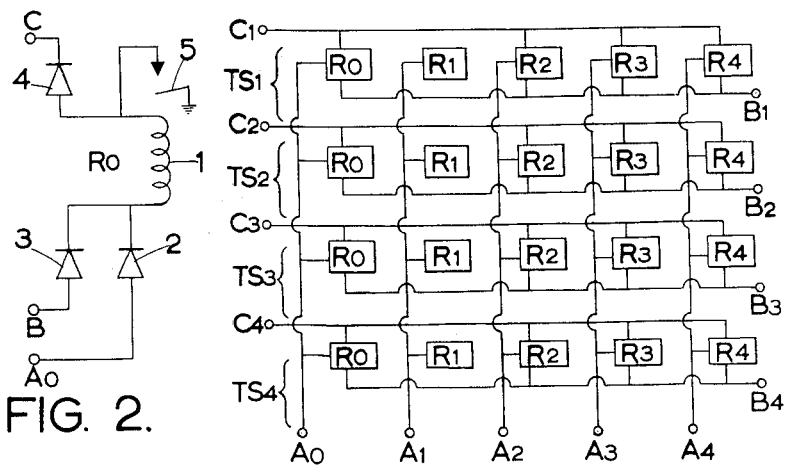
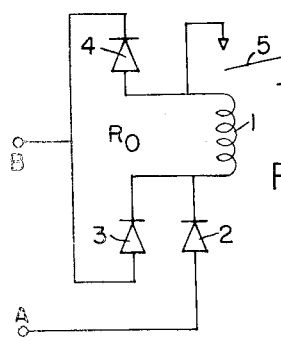
FIG. 1.
FIG. 2.
FIG. 3.
FIG. 4.
INVENTORS
C.A. GORDON LE MAY
BY G.H. STEPHENSON
ATTORNEYS

2,949,600

AUTOMATIC CONTROL SYSTEMS, ESPECIALLY FOR AUTOMATIC MACHINE TOOLS

Christopher Archibald Gordon Le May, Greenford, and Geoffrey Huson Stephenson, Ealing, London, England, assignors to Electric & Musical Industries Limited, Middlesex, England, a company of Great Britain Filed Oct. 1, 1954, Ser. No. 459,794

Claims priority, application Great Britain Oct. 3, 1953

5 Claims. (Cl. 340—166)

This invention relates to automatic control systems especially but not exclusively for automatic machine tools. The invention relates in particular to electrically operated switches for use in control systems, said switches for example forming part of a register for registering binary digital code signals.

An automatic machine tool, such for example as a milling machine, may be required to mill or otherwise shape a workpiece in accordance with a pattern which may be of arbitrary shape. One approach to this problem consists in calculating displacements from a predetermined datum (say the axis of the cutter or other tool) which the work holder is required to make to produce the correct dimensions of the workpiece at successive points on the desired pattern, and employing the calculated displacements to control the machine. This may be done, for example, by recording the calculated displacements in suitable records for example punched tapes, extracting the recorded information successively as the milling operation progresses, and employing the extracted information for controlling a servo system which in turn controls the component displacements of the machine. In United States patent specification No. 2,928,604, there is described an interpolating device for effecting curvilinear interpolation between the successive recorded values of the displacement, so that the component displacements of the machine can be controlled to a high degree of accuracy without the need to record an excessive number of calculated displacements. The device described in the aforesaid co-pending patent application is a form of analogue operated device which requires for its operation the application of alternating voltages having amplitudes which are analogues of the discrete values of displacement between which interpolation is required. To give a curvilinear interpolation the temporary storage of at least three analogue signals is required and two such interpolating devices, which are alternately effective, may be required for each component displacement, and more than one component may require to be dealt with. Moreover, in many cases it may be desirable to record the signals in binary code form in the record. Therefore, it is evident that simple circuits for routing and temporarily storing information extracted from the record are desirable to reduce the cost of the control system.

One object of the present invention is to provide an improved electrically operated switch which can facilitate the construction of a control system of the kind indicated in the preceding paragraph.

According to the present invention there is provided an electrically operated two condition switch comprising a conductive element whose conductivity state determines the state of the switch, a plurality of input connections, means responsive to simultaneous signals on a plurality of said input connection to switch said element to one of two conductivity states, namely the conducting and non-conducting states, and means responsive to a signal on one of said connections to switch said element to the other conductivity state.

By virtue of the present invention, it is readily possible to construct a register for binary code signals comprising a plurality of switches according to the invention, so that signals representing elements of the binary code applied individually to the input connections of the different switches do not produce any change in the conditions of the switches unless a conditioning signal is applied simultaneously to a different input connection from the code signals. On the other hand the register can be cleared by the application of a single signal to all the switches. In control systems composed of a plurality of registers of this construction binary code signals can be applied in parallel to all the registers and by providing separate means for applying conditioning signals to the individual registers it can be arranged that only a desired register or desired registers respond to the binary code signals. This result is moreover achieved with the use of a simple and robust circuit.

In order that the invention may be clearly understood and readily carried into effect, the invention will now be described with reference to the accompanying drawings in which:

Figure 1 illustrates, mainly in block form, one example of a register embodying switches in accordance with the present invention, Figure 2 illustrates in detail the operating circuit of one of the switches used in Figure 1, Figure 3 is a block diagram of a control system embodying a plurality of registers such as shown in Figure 1, and Figure 4 illustrates a modification of Figure 2.

Referring to Figure 1, the register thereof has a group of input terminals $A_0$, $A_1$, $A_2$ . . . From time to time groups of pulses are applied to these terminals each group representing a number in a binary pulse code form and being derived for example from a record in the form of a punched tape. The pulses of a group representing a number in a binary code are applied simultaneously to the contacts $A_0$, $A_1$, $A_2$ . . . in such a way that a pulse applied to $A_0$ represents a binary digit of lowest order (say $2^0$) whilst a pulse applied to $A_1$ represents a binary digit of next order, $2^1$, and so on. The terminals lead to a group of relays $R_0$, $R_1$, $R_2$ . . . which form the operating circuits of a group of two-condition switches. The group of relays has two other input terminals B and C each of which is common to all the relays. Terminal B is connected to a source of conditioning pulses and terminal C to a source of clearing pulses, and as will hereinafter appear the energised state of the relays corresponds to binary digits of value 0 and the de-energised state corresponds to binary digits of value 1. The switch operated by the relays are denoted by $S_0$, $S_1$, $S_2$ . . . and they are associated with a group of transformer windings $T_0$, $T_1$, $T_2$ . . . in such a way that in one condition of each switch (corresponding to the energised state of the respective relay) the respective transformer winding is open-circuited, and a second condition of each switch (corresponding to the de-energized state of the respective relay) the respective transformer winding is connected in circuit between the output terminal OT and ground. The first state of the switches corresponds to binary digits of value 0 and the switches $S_0$ and $S_4$ are shown in this state. The second state corresponds to binary digits of value 1 and the switches $S_1$, $S_2$ and $S_3$ are shown in this state. The group of transformer windings have a common primary winding T to which is applied an alternating voltage of fixed amplitude and the number of turns in the groups of windings $T_0$, $T_1$, $T_2$ . . . are such that the E.M.F. induced across each winding is twice that induced across the preceding winding.

Figure 2 illustrates the construction of one of the relays say the relay $R_0$. The relay comprises an energising winding 1 connected at one end to the terminals $A_0$ and B through unilaterally conductive devices in the form of metal (for example selenium) rectifiers 2 and 3 which have the same polarity. Other forms of rectifiers may of course be used. The other end of the winding 1 is connected to the terminal C by a third rectifier 4, also having the same polarity. The relay has a hold switch 5 which when closed connects the latter end of the winding 1 to ground. It will be appreciated that when the winding 1 is energized switch $S_0$ assumes the position shown in Figure 1 and the hold switch assumes the alternate position to that shown in Figure 2. When the relay is de-energized the switch $S_0$ is moved to the position opposite to that shown by Figure 1 and the switch 5 is positioned as shown by Figure 2.

The operation of Figures 1 and 2, will be described mainly with reference to the relay $R_0$ and associated parts, since it will be understood that all the other relays operate in identical manner. Before the register is required to accept a group of pulses representing a binary number a clearing pulse will in general be applied to the terminal C. Normally, each of the terminals $A_0$, $A_1$, $A_2$ . . . and the terminals B and C are maintained at a positive potential and the clearing pulse is negative and of such amplitude as momentarily to lower the terminal C at least to ground potential. Considering the relay $R_0$, the rectifiers 2, 3 and 4 then conduct and the relay is energised by the flow of current in the winding 1 regardless of the existing state of the relay, closing the switch 5 and moving the switch $S_0$ to the position shown in Figure 1. When the clearing pulse ceases the fact that the switch 5 is closed holds the relay in an energised state. Digital code pulses applied to the terminals $A_0$, $A_1$, $A_2$ . . . are all negative and of such polarity as momentarily to lower the respective terminals at least to ground potential and conditioning pulses applied to the terminal B are similar. If a binary code pulse and a conditioning pulse are now simultaneously applied to the relay $R_0$, both the rectifiers 2 and 3 are rendered non-conducting discontinuing the flow of current in the winding 1. As a consequence switch 5 is opened and the switch $S_0$ is changed to the alternate condition to that shown, connecting the winding $T_0$ between the terminal OT and ground. If, however, a digital code pulse is applied to $A_0$ without the simultaneous application of a conditioning pulse to the terminal B, the rectifier 3 remains conducting and maintains current in the winding 1. Thereby the relay is maintained in the energised state and no change occurs in the switch $S_0$. It will now be apparent that when a group of pulses is applied to the terminals $A_0$, $A_1$, $A_2$ . . . and a conditioning pulse is simultaneously applied to the terminal B, the states of the switches $S_0$, $S_1$, $S_2$ . . . are so changed that the switches assume a binary representation corresponding to the applied pulses and the number of transformer windings then connected between the output terminal OT and ground is such that an alternating voltage can be derived from OT having an amplitude which is the analogue of the number represented by the binary pulses. The register therefore not only acts as a temporary store but automatically converts the pulse code signals to a voltage analogue signal.

As aforesaid the register shown is especially adapted for use as a temporary store in automatic control systems for automatic machine tools. In the aforesaid United States patent specification 2,928,604, a control system is described which requires at least four temporary stores fed successively with numbers in binary pulse code form, and each of which is required to set up an alternating voltage whose amplitude is an analogue of the received number. Moreover, the temporary stores have to be filled and cleared in an advancing sequence such that the first four numbers are applied in succession to the four temporary stores whereupon the first temporary store is cleared and receives a fifth number, then temporary store 2 is cleared and receives a sixth number and so on. In Figure 3, four temporary stores are represented by the numerals $TS_1$, $TS_2$, $TS_3$ and $TS_4$ each comprising a group or row of relays $R_0$, $R_1$, $R_2$ . . . as in the case of Figure 1, the corresponding relays in the different stores being arranged in columns. The remaining parts of each store are not represented. The input terminals for the digital code pulses $A_0$, $A_1$, $A_2$ . . . are each applied to the corresponding relays in all the stores so that the digital code pulses are submitted to all the stores. However, each store has a separate conditioning input terminal $B_1$, $B_2$, $B_3$ or $B_4$ as the case may be. Similarly each store has an individual clearing terminal $C_1$, $C_2$, $C_3$ or $C_4$. Therefore the stores can be cleared individually and conditioned for the reception of received information and only a store which is so conditioned is sensitive to the digital code pulses. In this way the sequencing of the operation of the stores is achieved in a very simple manner.

The group of four stores indicated in Figure 3 will in general control displacement in the machine tool in only one direction and similar groups of stores will be required for any other coordinate displacement required. The sequencing of the stores can be further simplified in this case by arranging that the clearing pulses for one group of stores are used as conditioning pulses for another group of stores.

For simplicity the invention has been illustrated as applied to stores for accepting numbers in binary digital code having only five digits, and it will be appreciated that in practice a higher number of digits may be employed. Moreover, the invention is not confined to automatic machine tools but can be applied to other control systems in which temporary storage facilities are required.

The relay shown in Figure 2 may be modified as shown in Figure 4 by connecting terminals B and C together and to a single source of conditioning pulses. The terminals are biassed in the same way as described with reference to Figure 2, and the applied pulses are of the same polarity and amplitude as described with reference to that figure. In this case no separate clearing pulses are required and the relay operates as follows. If a digital code pulse arrives at $A_0$ but no pulse is applied to B and C, the digital code pulse cannot alter the state of the relay. If a conditioning pulse arrives at B and C but no pulse arrives at $A_0$, the relay is energised regardless of its existing state. Moreover, if a pulse arrives at $A_0$ simultaneously with a pulse at B and C the relay is de-energized regardless of its existing state. Therefore the digital pulse code signal "0" or "1" is transferred to the relay each time a conditioning pulse occurs. This arrangement has the advantage that time is saved in clearing and refilling stores, and the relays also perform fewer operations so that their life should be longer.

What we claim is:

1. An electrically operated switch comprising a relay winding the magnitude of the current in which determines the state of the switch, at least two input terminals, first and second unilaterally conductive devices connected respectively from one end of said winding to two of said input terminals, a third unilaterally conductive device connected from the other end of said winding to one of said input terminals, a hold switch operative by current in said winding to connect, when closed, the other end of said winding to a point of substantially fixed potential, said three unilaterally conductive devices being connected for the conduction of current in the same direction through said winding, means for applying biasing potential to said input terminals, means for applying simultaneously to two of said input terminals switching pulses of polarity predetermined in relation to said potentials to produce a current change in said winding in one sense, thereby to establish the switch in one state, and means for applying to one of said input terminals a switching pulse of a polarity predetermined in relation to said potentials to produce a current change in said winding in the opposite sense thereby to establish the switch in a second state.

2. A switch according to claim 1, said second and third unilaterally conductive devices being connected to a common input terminal.

3. An electrically operated switch comprising a relay winding the magnitude of the current in which determines the state of the switch, at least two terminals, first and second unilaterally conductive devices connected respectively from one end of said winding to two of said input terminals, a third unilaterally conductive device connected from the other end of said winding to one of said input terminals, a hold switch operative by current in said winding to connect, when closed, the other end of said winding to a point of substantially fixed potential, said three unilaterally conductive devices being connected for the conduction of current in the same direction through said winding, means for applying potentials to said input terminals to bias each of said terminals in the same sense with respect to said substantially fixed potential, means for applying simultaneously to said two of said input terminals switching pulses predetermined to counteract temporarily the respective bias potentials, thereby to discontinue any current flow in said winding to establish the switch in one state, and means for applying to said one of said input terminals a switching pulse predetermined to counteract the respective bias potential to initiate a current flow in said winding, to establish the switch in a second state.

4. A register for binary code signals comprising a row of two state switches corresponding respectively to a series of binary digital places; a row of binary signal input terminals one for each switch; at least one common input terminal; a point of substantially fixed potential; each said switch comprising a winding the magnitude of the current in which determines the state of the switch, a first unilaterally conductive device connected from one end of said winding to the respective binary signal input terminal, a second unilaterally conductive device connected from the same end of said winding to a common input terminal, a third unilaterally conductive device connected from the other end of said winding to a common input terminal, said devices being connected to allow the conduction of current in the same direction through said winding, and a hold switch operative by current in said winding to connect, when closed, the other end of said winding to said point of substantially fixed potential; means for applying potentials selectively to said terminals to bias the respective terminals relative to said susbtantially fixed potential; means for applying binary signals to the respective binary signal input terminals; means for applying a conditioning signal to a common input terminal; and means for applying a clearing signal to a common input terminal, the polarity of said signals being predetermined in relation to said potentials to cause the state of the switches to register applied binary signals only in response to the simultaneous occurrence of the binary signals and a conditioning signal and to cause said switches to return to a zero state in response to a clearing signal alone.

5. A control system comprising a plurality of binary code signal registers according to claim 4, corresponding switches in different registers forming columns of switches having respectively common binary signal input terminals, and said registers having separate means for applying conditioning signals individually to the respective registers.

References Cited in the file of this patent

UNITED STATES PATENTS

| | | |
|---|---|---|
| 584,463 | Creelman | June 15, 1897 |
| 2,676,289 | Wulfsberg et al. | Apr. 20, 1954 |
| 2,682,814 | Higonnet | July 6, 1954 |
| 2,685,084 | Lippel et al. | July 27, 1954 |
| 2,696,600 | Serrell | Dec. 7, 1954 |
| 2,738,504 | Gray | Mar. 13, 1956 |

FOREIGN PATENTS

| | | |
|---|---|---|
| 647,724 | Germany | July 10, 1937 |

OTHER REFERENCES

"The Design of Switching Circuits," pp. 221-226, by Keister, Ritchie, and Washburn, publishers D. Van Nostrand Co., Inc., Princeton, N.J. (1951 Edition).

"The Design of Switching Circuits," pp. 218 and 219, by Keister, Ritchie and Washburn, published by Van Nostrand Co., Inc., Princeton, N.J.